(12) United States Patent
Kihara et al.

(10) Patent No.: US 8,398,178 B2
(45) Date of Patent: Mar. 19, 2013

(54) VEHICLE WHEEL DISK

(75) Inventors: Yuji Kihara, Chigasaki (JP); Yoshinobu Sakashita, Yokohama (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/088,898

(22) Filed: Apr. 18, 2011

(65) Prior Publication Data

US 2011/0193404 A1 Aug. 11, 2011

Related U.S. Application Data

(63) Continuation of application No. PCT/JP2009/068658, filed on Oct. 30, 2009.

(30) Foreign Application Priority Data

Oct. 31, 2008 (JP) ................................ 2008-280793
Oct. 30, 2009 (JP) ................................ 2009-249722

(51) Int. Cl.
*B60B 3/04* (2006.01)

(52) U.S. Cl. .......... 301/64.101; 301/63.101; 301/63.103

(58) Field of Classification Search ............. 301/63.101, 301/63.103–63.104, 63.106–63.108, 64.101, 301/64.704

See application file for complete search history.

(56) References Cited

U.S. PATENT DOCUMENTS

| 4,610,482 A * | 9/1986 | Overbeck et al. ........ 301/63.105 |
| 2003/0080605 A1 | 5/2003 | Coleman |
| 2003/0080606 A1 | 5/2003 | Coleman |
| 2003/0080607 A1 | 5/2003 | Coleman |
| 2003/0080608 A1 | 5/2003 | Coleman |
| 2004/0227392 A1 | 11/2004 | Coleman |
| 2005/0006945 A1 * | 1/2005 | Alff et al. ................. 301/63.108 |
| 2005/0017570 A1 * | 1/2005 | Alff et al. ................. 301/63.101 |
| 2005/0017571 A1 | 1/2005 | McCorry |
| 2006/0197371 A1 * | 9/2006 | Coleman et al. ......... 301/63.101 |
| 2007/0222279 A1 * | 9/2007 | Csapo et al. ............. 301/64.101 |
| 2012/0074764 A1 * | 3/2012 | McCorry et al. ......... 301/64.101 |

FOREIGN PATENT DOCUMENTS

| JP | 10-264601 | 10/1998 |
| JP | 11-254901 | 9/1999 |
| JP | 2005-035330 | 2/2005 |
| JP | 2005-507810 | 3/2005 |
| JP | 2005-509552 | 4/2005 |

(Continued)

OTHER PUBLICATIONS

International Preliminary Report on Patentability issued in PCT/JP2009/068975 on Jul. 7, 2011.

(Continued)

*Primary Examiner* — Jason Bellinger
(74) *Attorney, Agent, or Firm* — DLA Piper LLP (US)

(57) ABSTRACT

The technology provides vehicle wheel disks where a spoke portion can have a spoke bottom wall and a spoke side portion. The spoke side portion can include a spoke side wall rising from the spoke bottom wall in an axial direction of the wheel and a spoke reinforcing wall connected from an axially end portion of the spoke side wall and curved from the axial direction of the wheel toward a circumferential direction of the wheel and extending in the circumferential direction of the wheel. A pair of spoke side portions can be located on opposite sides of the vent window in the circumferential direction of the wheel have radially inner end portions which are connected to each other via a connecting wall. The connecting wall can be flat or substantially flat in the circumferential direction of the wheel.

7 Claims, 8 Drawing Sheets

FOREIGN PATENT DOCUMENTS

| | | |
|---|---|---|
| JP | 2005-511371 | 4/2005 |
| JP | 2007-137209 | 6/2007 |
| WO | WO 03/037651 | 5/2003 |
| WO | WO 2007/146260 | 12/2007 |

OTHER PUBLICATIONS

International Search Report issued in PCT/JP2009/068658 on Feb. 2, 2010.
English Language Abstract of JP 2005-509552 Published Apr. 14, 2005.
English Language Translation of JP 2005-509552 Published Apr. 14, 2005.
English Language Abstract of JP 2005-511371 Published Apr. 28, 2005.
English Language Translation of JP 2005-511371 Published Apr. 28, 2005.
English Language Abstract of JP 2005-507810 Published Mar. 24, 2005.
English Language Translation of JP 2005-507810 Published Mar. 24, 2005.
English Language Abstract of JP 2005-035330 Published Feb. 10, 2005.
English Language Translation of JP 2005-035330 Published Feb. 10, 2005.
International Search Report issued in PCT/JP2009/068975 on Feb. 2, 2010.
English Language Abstract of JP 11/254901 published Sep. 21, 1999.
English Language Translation of JP 11/254901 published Sep. 21, 1999.
English Language Abstract of JP 10-264601 published Oct. 6, 1998.
English Language Translation of JP 10-264601 published Oct. 6, 1998.
International Preliminary Report on Patentability issued in PCT/JP2009/068658 on Jun. 16, 2011.
English Language Abstract of JP 2007-137209 published Jun. 7, 2007.
English Language Translation of JP 2007-137209 published Jun. 7, 2007.
Japanese Office Action issued in JP 2009-249722 on Dec. 18, 2012.
Englished Language Translation of Japanese Office Action issued in JP 2009-249722 on Dec. 18, 2012.

\* cited by examiner

PRIOR ART

US 8,398,178 B2

VEHICLE WHEEL DISK

RELATED APPLICATIONS

This is a continuation of PCT/JP2009/068658, filed Oct. 30, 2009, currently pending, which claims priority to JP 2008-280793, filed on Oct. 31, 2008 and JP 2009-249722, filed on Oct. 30, 2009, currently pending. The contents of all of these applications are incorporated herein by reference in their entirety.

TECHNICAL FIELD

The present technology relates to a vehicle wheel disk. More particularly, the present technology relates to a vehicle wheel disk fabricated from a plate material.

BACKGROUND

U.S. Publication No. 2006/0197371 discloses a vehicle wheel disk having an axially outwardly extending rib or protrusion at a position located radially inside a vent window, as shown in FIG. 4 thereof.

More particularly, in FIG. 4 of U.S. Publication No. 2006/0197371, the rib extends in a radial direction of the wheel from a first portion to a second portion. The first portion is a vent window surrounding curved portion which is located radially inside the vent window and is curved axially inwardly. The second portion is a portion located radially inside a ring region where hub bolt holes are provided. In a cross section of the wheel taken along a plane perpendicular to an axial direction of the wheel, the rib has a pair of side walls and a crest wall that connects ends of the pair of side walls and has the configuration of a convex arc with a single curvature.

BRIEF SUMMARY

The present technology relates to vehicle wheel disks fabricated from a plate material.

In one aspect, a vehicle wheel disk is provided that includes a hub coupling portion, an inclined portion substantially conical and rising from the hub coupling portion, a plurality of spoke portions each extending outwardly from the inclined portion in a radial direction of the wheel, a vent window located between adjacent spoke portions of the plurality of spoke portions, and a radially outer disk portion (which may be called as a disk radially outer portion) located at a radially outer end portion of the wheel and connecting radially outer end portions of the plurality of spoke portions in a circumferential direction of the wheel. The inclined portion extends radially outwardly and axially outwardly from the radially outer portion of the hub coupling portion. The spoke portion has a spoke bottom wall and a spoke side portion. The spoke bottom wall extends outwardly from the inclined portion in the radial direction of the wheel. The spoke side portion includes a spoke side wall rising from the spoke bottom wall in an axial direction of the wheel and a spoke reinforcing wall connected from an axially end portion of the spoke side wall and curved from the axial direction of the wheel toward the circumferential direction of the wheel and extending in the circumferential direction of the wheel. A pair of spoke side portions located on opposite sides of the vent window in the circumferential direction of the wheel have radially inner end portions which are connected to each other via a connecting wall. The connecting wall is flat or substantially flat in the circumferential direction of the wheel, and is connected to the inclined portion at a radially inner end of the connecting wall.

BRIEF DESCRIPTION OF THE DRAWINGS

Specific examples have been chosen for purposes of illustration and description, and are shown in the accompanying drawings, forming a part of the specification.

DETAILED DESCRIPTION OF THE PREFERRED EMBODIMENTS

Vehicle wheel disks according to the present technology are illustrated in FIGS. 1 through 11 and 14. The same reference numbers are used to denote like structural components throughout the Figures.

Figure 1:
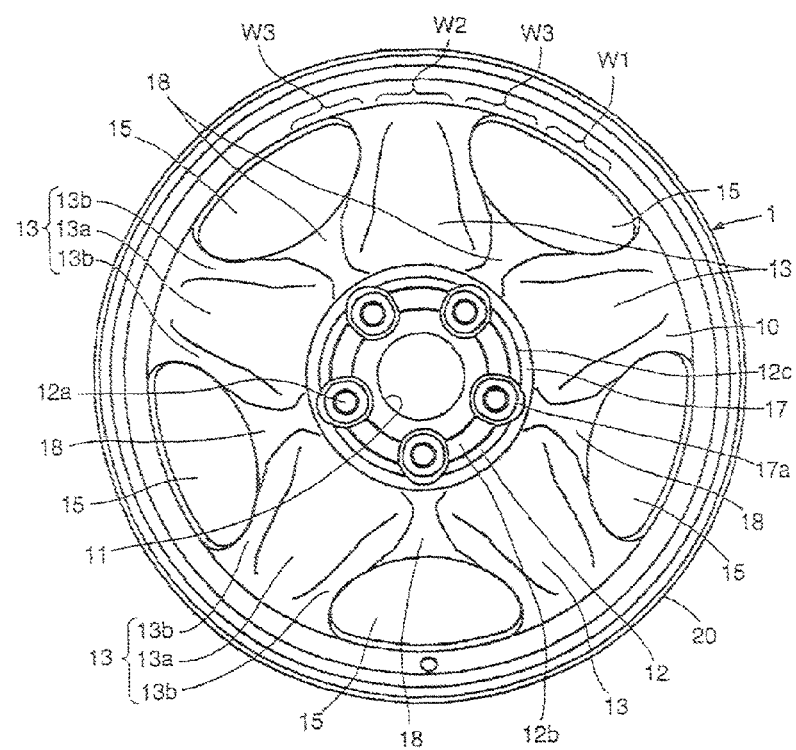
FIG. 1 is a front view of a vehicle wheel disk welded with a rim according to one embodiment of the present technology.
Figure 2:
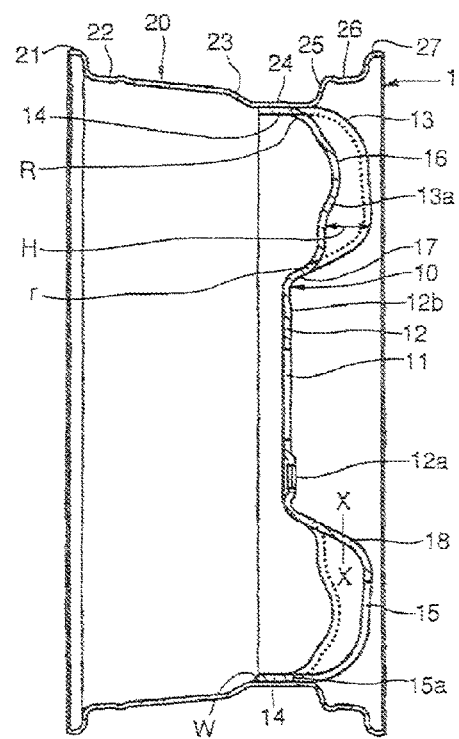
FIG. 2 is a cross-sectional view of the vehicle wheel disk welded with a rim, according to the embodiment shown in FIG. 1.

A vehicle wheel disk (which may be called a wheel disk or a disk, hereinafter) 10 according to the present technology can be a wheel disk used for a car, a truck, a bus, a vehicle used for business, etc. The wheel disk 10 includes a wheel disk fabricated from a plate (for example, a steel plate) by forming (for example, forming by press) and does not include a cast wheel. As illustrated in FIGS. 1 and 2, the wheel disk 10 is welded with an annular rim (a part for holding a tire) 20 to construct a wheel 1.

As illustrated in FIG. 2, the rim 20 includes an inboard flange portion 21, an inboard bead seat portion 22, an inboard side wall portion 23, a drop portion 24, an outboard side wall portion 25, an outboard bead seat portion 26 and an outboard flange portion 27. The inboard flange portion 21, the inboard bead seat portion 22 and the inboard side wall portion 23 are located closer to an inside of a vehicle than the outboard side wall portion 25, the outboard bead seat portion 26 and the outboard flange portion 27 in an axial direction of the wheel when the wheel 1 is installed on the vehicle.

Figure 12:
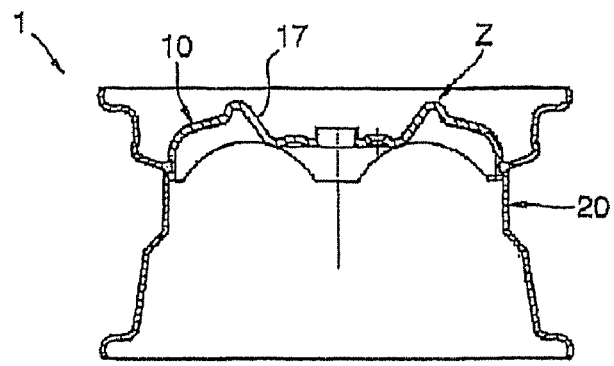
FIG. 12 is a cross-sectional view of an ordinary vehicle wheel disk different from the present technology.
Figure 13:
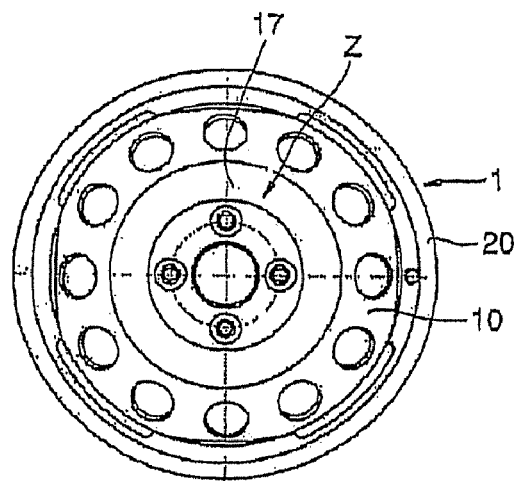
FIG. 13 is a front view of the ordinary vehicle wheel disk of FIG. 12.

The wheel disk 10 includes a hub hole 11, a hub coupling portion 12, a spoke portion 13, a radially outer disk portion 14, a vent window 15 and an inclined portion 17. The wheel disk 10 does not have an annular, circumferentially continuous and axially protruding protrusion Z located radially outside a hub coupling portion 12, which are adopted in the conventional vehicle wheel disk of FIGS. 12 and 13.

As illustrated in FIG. 1, the hub hole 11 can be located at a radially central portion of the wheel disk 10.

Figure 3:
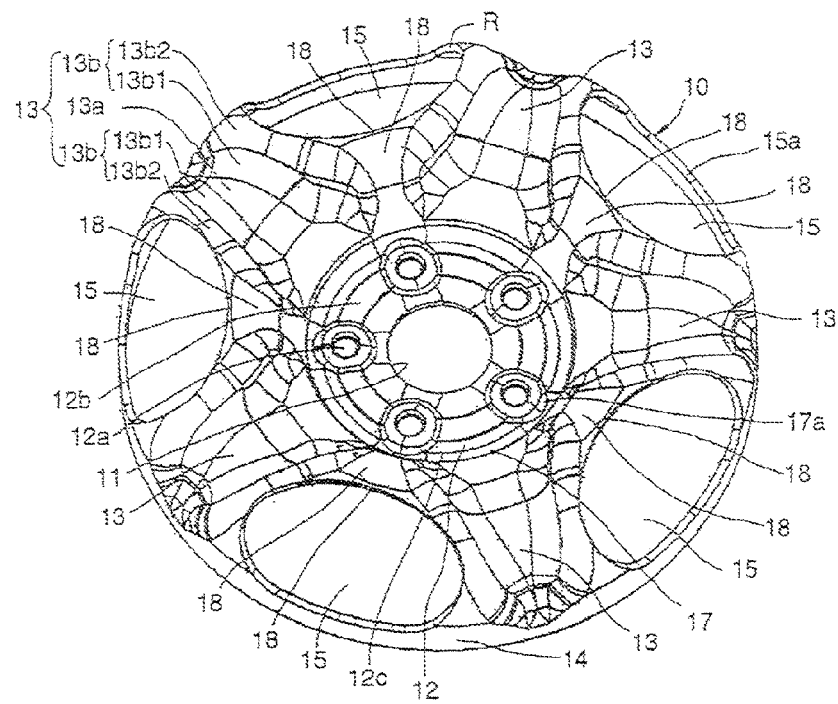
FIG. 3 is an oblique view of the vehicle wheel disk showing its curved surface by skeleton lines according to the embodiment shown in FIG. 1.

As illustrated in FIGS. 1 through 3, the hub coupling portion 12 surrounds the hub hole 11. The hub coupling portion 12 can be in the form of a flat plate or a substantially flat plate and can be perpendicular or substantially perpendicular to a wheel axial direction (to an axis of the wheel disk 10). A plurality of hub bolt holes 12a are provided in the hub coupling portion 12. The hub bolt holes 12a can be equally spaced along a circumferential direction of the wheel. In one embodiment, five hub bolt holes may be provided. The number of the hub bolt holes 12a may vary in different embodiments of the present technology, including but not limited to three, four, or six or more hub bolt holes. By passing hub bolts (not shown) extending from a huh (not shown) through the hub bolt holes 12a and coupling hub nuts (not shown) with the hub bolts, the disk wheel 10 (the wheel 1) can be fixed to the hub. As illustrated in FIGS. 1 and 2, an arch band 12b and a swell (a sub-rib) 17a are provided at the hub coupling portion 12. The arch band 12b and the swell 17a may improve rigidity and durability of the hub coupling portion 12. The arch band 12b connects hub bolt holes 12a, is discontinuously annular and convexly swells axially outwardly. The extent of the swell may be small, such as being from about 0.3 mm to about 5 mm. The swell (a sub-rib) 17a extends between the inclined portion 17 and the hub bolt hole 12a and swells axially outwardly.

As illustrated in FIG. 1, a radially outer portion 12c (a boundary between the hub coupling portion 12 and the inclined portion 17) of the hub coupling portion 12 defines a circle broken by the sub-rib 17a.

As illustrated in FIG. 2, an axially inner surface of the hub coupling portion 12 can be positioned between an axially outer portion and an axially inner portion of the radially outer disk portion 14 in the axial direction of the wheel.

The spoke portion 13 extends radially outwardly in the radial direction of the wheel from the inclined portion 17 to the radially outer disk portion 14. A plurality of spoke portions 13 can be provided as illustrated in FIG. 1. The spoke portions 13 can be equally spaced along a circumferential direction of the wheel. In one embodiment, five spoke portions 13 may be provided. The number of the spoke portions 13 may vary in different embodiments of the technology, including but not limited to three, four or six or more spoke portions.

Figure 14:
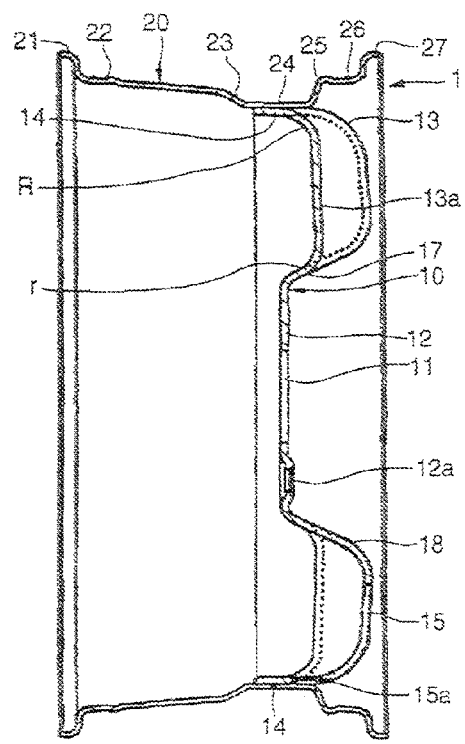
FIG. 14 is a cross-sectional view of the vehicle wheel disk according to the embodiment shown in FIG. 1, where a wavy portion is not provided in the spoke portion and the disk is welded to the rim.

As illustrated in FIGS. 2 and 14, a radially outer end portion of the spoke portion 13 forms a radially outer curved connecting portion R which is bent axially inwardly and is connected to the radially outer disk portion 14. A radially inner end portion of the spoke portion 13 forms a radially inner curved connecting portion r which is bent axially inwardly and is connected to the inclined portion 17. A radially intermediate portion (between the radially outer curved connecting portion R and the radialy inner curved connecting portion r) of the spoke portion 13 extends in a direction perpendicular (or substantially perpendicular) to the axial direction of the wheel. Radially opposite ends of the radially intermediate portion of the spoke portion 13 can be located at substantially equal axial positions in the wheel axial direction.

Since the radially intermediate portion of the spoke portion 13 extends in the direction perpendicular to the axial direction of the wheel, when a transverse load acts on a tire (the rim 20) during running of a vehicle, a large bending moment acts on the spoke 13. In order to suppress a deformation of the spoke portion 13 due to the large bending moment and to increase durability of the wheel, the spoke portion 13 has the spoke bottom wall 13a and the spoke side portions 13b as shown in FIGS. 1,3,10 and 11.

The spoke bottom wall 13a extends outwardly in the radial direction of the wheel from the inclined portion 17. The spoke bottom wall 13a extends in the circumferential direction of the wheel (in a width direction of the spoke portion 13) in a cross section taken along a plane perpendicular to the radial direction of the wheel.

The spoke side portion 13b includes a spoke side wall 13b1 and a spoke reinforcing wall 13b2.

Figure 10:
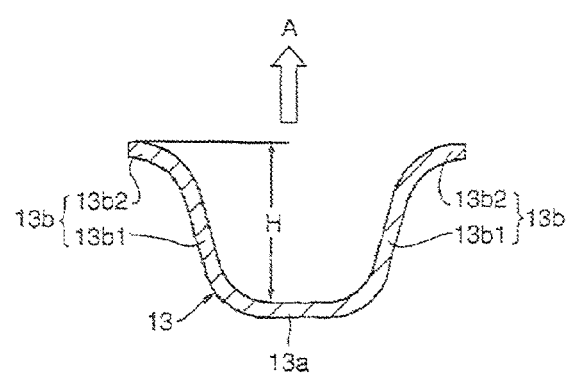
FIG. 10 is a cross-sectional view of a spoke portion of the vehicle wheel disk according to the embodiment shown in FIG. 1, taken along a plane perpendicular to a radial direction of the wheel, where a spoke side wall extends outwardly in the axial direction of the wheel from a spoke bottom wall.
Figure 11:
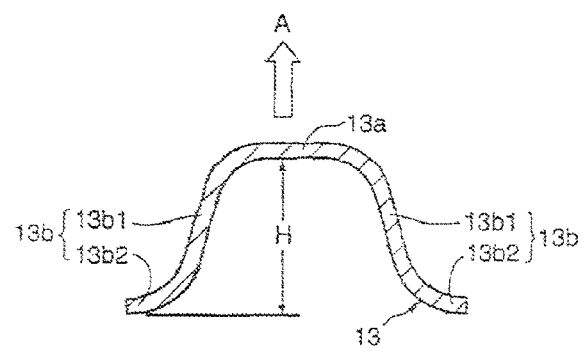
FIG. 11 is a cross-sectional view of a spoke portion of the vehicle wheel disk according to the embodiment shown in FIG. 1, taken along a plane perpendicular to a radial direction of the wheel, where a spoke side wall extends inwardly in the axial direction of the wheel from the spoke bottom wall.

The spoke side wall 13b1 extends (rises) from wheel-circumferentially opposite ends of the spoke bottom wall 13a in a direction away from the spoke bottom wall 13a and in the axial direction of the wheel. The spoke side wall 13b1 may extend from the spoke bottom wall 13a axially outwardly as illustrated in FIG. 10 or may extend from the spoke bottom wall 13a axially inwardly as illustrated in FIG. 11. In FIGS. 10 and 11, "A" shows the axially outward direction of the wheel. Generally, in the description and Figures, the case where the spoke side wall 13b1 extends from the spoke bottom wall 13a in the axially outward direction of the wheel is referenced, unless noted as being otherwise.

As illustrated in FIGS. 10 and 11, the spoke reinforcing wall 13b2 extends from an end of the spoke side wall 13b1 opposite the spoke bottom wall in the wheel axial direction and curves from the wheel axial direction toward the wheel circumferential direction. The spoke reinforcing wall 13b2 extends in the wheel circumferential direction so as to increase the circumferential width of the spoke portion 13.

As illustrated in FIG. 2, the spoke portion 13 is located more outwardly in the axial direction of the wheel than the hub coupling portion 12 and the radially outer disk portion 14. As a result, when the wheel 1 is subjected to a load (for example when mounted on a vehicle), a bending moment directed axially inwardly can act on a spoke portion 13 located on a ground side.

In a case where the spoke side wall 13b1 extends outwardly in the axial direction of the wheel from the spoke bottom wall 13a, a tension stress can be caused at the spoke reinforcing wall 13b2 in the radial direction of the wheel and that can support the load. This may ensure a rigidity of the disk.

In a case where the spoke side wall 13b1 extends inwardly in the axial direction of the wheel from the spoke bottom wall 13a, a compression stress can be caused at the spoke reinforcing wall 13b2 in the radial direction of the wheel. As a result, a portion of the spoke portion 13 located at a boundary to the vent window 15 is not liable to be affected by small notches caused when punching the vent window, and durability of the wheel can be improved.

An axial width H of the spoke side portion 13b can be greatest at a vicinity of a radially inner end of the vent window 15 as illustrated in FIG. 2, which can effectively increase a rigidity of the wheel 1. The maximum of the axial width H of the spoke side portion 13b can be within a range of two to twenty times the thickness of the spoke bottom wall 13a. Preferably, the maximum of the axial width H of the spoke side portion 13b is within a range of four to ten times of the thickness of the spoke bottom wall 13a. This may yield a high rigidity of the wheel 1 and a good formability of the wheel disk 10.

Though the axial width H of the spoke side portion 13b is gradually decreased in a radially outward direction spaced away from the maximum width portion as illustrated in FIG. 2, in an alternative embodiment the axial width H may increase.

In one embodiment, as illustrated in FIG. 2, a wavy portion 16, which is formed by waving a part of the spoke bottom wall 13a, may be provided in the spoke portion 13. The wavy portion 16 can be a portion where a part of the spoke bottom wall 13a is displaced axially outward compared with a spoke bottom wall 13a having no wavy portion. The wavy portion 16 can reduce a section modulus of a cross section of the spoke portion 13 taken along a plane perpendicular to the wheel radial direction about an axis perpendicular to the wheel axial direction and to the wheel radial direction of each spoke portion 13. Since the wavy portion 16 can be provided at the spoke portion 13, a rigidity of the wavy portion 16 of the spoke portion 13 can be smaller than a rigidity of a spoke portion having no wavy portion. As a result, stress concentrations at the connecting portion between the spoke portion 13 and the inclined portion 17 (the radially inner curved connecting portion r) and at the connecting portion between the spoke portion 13 and the radially outer disk portion 14 (the radially outer curved connecting portion R) can be reduced, and the fatigue durability of the wheel 1 can be increased.

In another embodiment, as illustrated in FIG. 14, a wavy portion is not required to be provided at the spoke portion 13.

As illustrated in FIG. 1, the vent window 15 can be located between circumferentially adjacent spoke portions 13. A width of the spoke portion 13 in the circumferential direction of the wheel can be narrowest at a portion of the spoke portion corresponding to a largest interior-width portion of each of the vent windows 15 located on opposite sides of the spoke portion 13.

As illustrated in FIGS. 1 and 2, the inclined portion 17 is a substantially cylindrical (conical and tapered) portion located radially outside of the hub coupling portion 12. The inclined portion 17 connects the spoke bottom wall 13a and the hub coupling portion 12. The inclined portion 17 extends radially outwardly and axially outwardly from a radially outer portion 12c of the hub coupling portion 12.

As illustrated in FIG. 3, the radially outer disk portion 14 is located at or near a radially outer end portion of the wheel disk 10. The radially outer disk portion 14 can be formed in the shape of a ring and connects radially outer end portions of the plurality of the spoke portions 13 in the circumferential direction of the wheel. The radially outer disk portion 14 can be cylindrical and can have a constant or a substantially constant diameter over its entire axial length.

As illustrated in FIG. 2, the radially outer disk portion 14 is fit to the rim 20 at the drop portion 24 of the rim 20 and can be fixed to the rim 20 by welding or other means. The radially outer disk portion 14 may alternatively be fit to the rim 20 at the inboard bead seat portion 22 or the outboard bead seat portion 26.

The radially outer disk portion 14 may be fixed to the rim 20 at a position W1 (shown in FIG. 1) only, where W1 is defined as a circumferential position extending circumferentially along an axially inner end of a portion of the radially outer disk portion 14 located adjacent to the vent window 15.

The radially outer disk portion 14 may alternatively be fixed to the rim 20 at a position W2 (shown in FIG. 1) only, where W2 is defined as a circumferential position extending circumferentially along an axially inner end of a portion of the radially outer disk portion 14 located adjacent to a radially outer end portion of the spoke portion 13.

The radially outer disk portion 14 may alternatively be fixed to the rim 20 at a position W3 (shown in FIG. 1) only, where W3 is defined as a circumferential position extending circumferentially along an axially inner end of a portion of the radially outer disk portion 14 located adjacent to a disk portion between the vent window 15 and the radially outer end portion of the spoke portion 13.

The radially outer disk portion 14 may alternatively be fixed to the rim 20 at any two positions selected from the circumferential positions W1, W2 and W3 (at W1 and W2, or at W1 and W3, or at W2 and W3). The radially outer disk portion 14 may alternatively be fixed to the rim 20 at all of the circumferential positions W1, W2 and W3.

When the radially outer disk portion 14 is fixed to the rim 20 at the position W1 only, stress concentration on the weld can be reduced, and a fatigue durability of the wheel 1 can be increased, because the rigidity at the position W1 can be less than that at the position W2.

When the radially outer disk portion 14 is fixed to the rim 20 at the position W2 only, a load from the rim 20 can be surely transmitted to the hub coupling portion 12 through the spoke portion 13.

When the radially outer disk portion 14 is fixed to the rim 20 at the position W3 only, welding can be surely conducted, because an axial position of the position W3 after press-forming is stable, even if the vent window 15 is punched before the radially outer disk portion 14 is press-formed.

Figure 8:
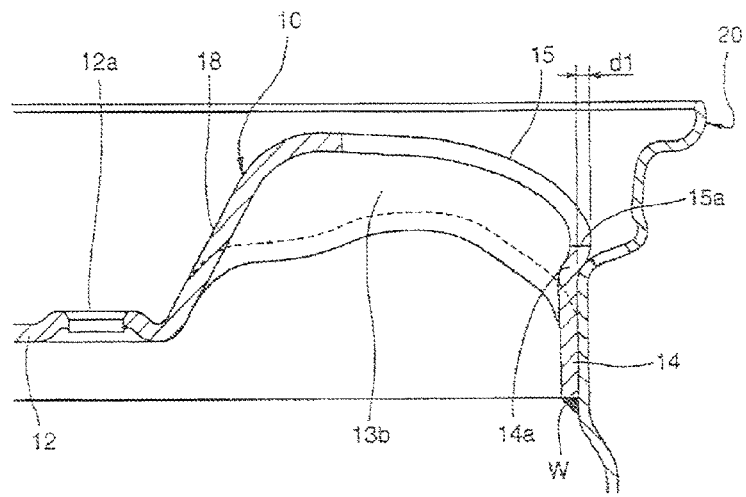
FIG. 8 is a cross-sectional view of a radially outer disk portion of a vehicle wheel disk according to a second embodiment of the present technology.
Figure 9:
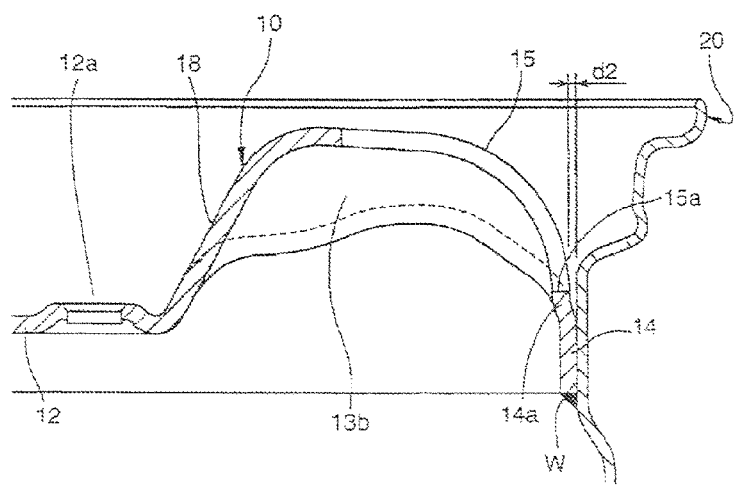
FIG. 9 is a cross-sectional view of a radially outer disk portion of a vehicle wheel disk according to a third embodiment of the present technology.

When the radially outer disk portion 14 is fixed to the rim 20 by welding, the weld W may be axially positioned at the axially inner end of the radially outer disk portion 14 (as shown in FIGS. 2, 8 and 9), or at the axially outer end of the radially outer disk portion 14 (not shown), or at both of the axially inner and outer ends of the radially outer disk portion 14.

As illustrated in FIG. 1, the vent window 15 is located between adjacent spoke portions 13 in the circumferential direction of the wheel. The vent windows 15 can be spaced equally along the circumferential direction of the wheel. The same number of vent windows 15 as that of the spoke portions 13 can be provided. A radially outer end portion 15a of the vent window 15 defines an axially innermost portion of the vent window 15. In FIGS. 2 and 3, the radially outer end portion 15a of the vent window 15 reaches the radially outer disk portion 14 and is directly connected to the radially outer disk portion 14. Alternatively, as illustrated in FIGS. 8 and 9, a tapered or stepped shift portion 14a may be provided between the vent window 15 and the radially outer disk portion 14.

As illustrated in FIG. 8, the shift portion 14a is stepped. A diameter of a portion of the shift portion 14a closer to the vent window 15 is larger than a diameter of a portion of the shift portion 14a closer to the radially outer disk portion 14. The radially outer end portion 15a of the vent window 15 is located radially outside a radially outer surface of the radially outer disk portion 14. Preferably, a difference in radius (a step amount) d1 between the radially outer surface of the radially outer disk portion 14 and a radially outer surface of the shift portion 14a is smaller than a thickness of the radially outer disk portion 14, and can be, for example, from about 5 mm to about 8 mm, or from about 2.5 mm to about 8 mm. More preferably, the step amount d1 can be about 0.5 mm or larger, and equal to or smaller than the thickness of the radially outer disk portion 14. When the step amount d1 is about 0.5 mm or larger and equal to or smaller than the thickness of the radially outer disk portion 14, a rigidity of the radially outer disk portion 14 is improved resulting that the durability of the wheel 1 can be improved. Further, positioning the wheel disk 10 relative to the rim 20 in the axial direction at the time of assembly of the wheel disk 10 and the rim 20 may be easier due to the stepped shift portion 14a. If the step amount d1 is smaller than 0.5 mm, the effect of the axial positioning can become small. Though the step amount d1 may be larger than the thickness of the radially outer disk portion 14, it can become difficult to press-form the wheel disk 10.

As illustrated in FIG. 9, the shift portion 14a is stepped. A diameter of a portion of the shift portion 14a closer to the vent window 15 is smaller than a diameter of a portion of the shift portion 14a closer to the radially outer disk portion 14. The radially outer end portion 15a of the vent window 15 is located radially inside the radially outer surface of the radially outer disk portion 14. Preferably, a difference in radius (a step amount) d2 between the radially outer surface of the radially outer disk portion 14 and a radially outer surface of the shift portion 14a is smaller than a thickness of the radially outer disk portion 14, and can be, for example, from about 5 mm to about 8 mm, or from about 2.5 mm to about 8 mm. More preferably, the step amount d2 is about 0.5 mm or larger and equal to or smaller than the thickness of the radially outer disk portion 14. When the step amount d2 is about 0.5 mm or larger and equal to or smaller than the thickness of the radially outer disk portion 14, the rigidity of the radially outer disk portion 14 can be improved which can result in the durability of the wheel 1 also being improved. Since the diameter of the shift portion 14a is smaller than the diameter of the radially outer disk portion 14, fitting the wheel disk 10 into the rim 20 at the time of assembly of the wheel disk 10 and the rim 20 can be easier. If the step amount d2 is smaller than about 0.5 mm, the easy fitting effect due to the stepped shift portion can become small, because the fitting between the rim 20 and the wheel disk 10 is a tight fitting and the wheel disk 10 is deformed so as to decrease the step amount when the wheel disk 10 is fitted into the rim. Though the step amount d2 may be larger than the thickness of the radially outer disk portion 14, it can become difficult to press-form the wheel disk 10. Further, the vent window 15 can become small so that a design of the wheel may be degraded.

Figure 4:
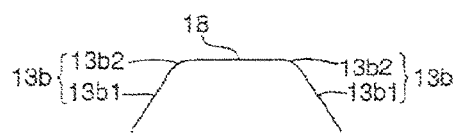
FIG. 4 is a cross-sectional view of the vehicle wheel disk taken along line X-X of FIG. 2, where the configuration of the connecting wall taken along a plane perpendicular to an axial direction of the wheel is constructed from a straight line.
Figure 5:
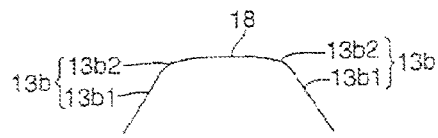
FIG. 5 is a cross-sectional view of the vehicle wheel disk taken along line X-X of FIG. 2, where the configuration of the connecting wall taken along a plane perpendicular to an axial direction of the wheel is constructed from an arc or ellipse having a radius of curvature larger than the radius of curvature of each of spoke the reinforcing walls located on opposite sides of the connecting wall.

As illustrated in FIGS. 3-5, the pair of spoke side portions 13b (spoke reinforcing walls 13b2) located on opposite sides of the vent window 15 in the circumferential direction of the wheel have radially inner end portions which are connected to each other in the circumferential direction of the wheel via a connecting wall 18 which is flat or substantially flat in the circumferential direction of the wheel, at a position radially inside the vent window 15. The flat or substantially flat connecting wall 18 can include the case of FIG. 4, where a cross section of the connecting wall taken along a plane perpendicular to the wheel axial direction is constructed of a straight line, and can include the case of FIG. 5, where a cross section of the connecting wall taken along a plane perpendicular to the wheel axial direction is constructed of an arc or ellipse having a radius of curvature larger than (preferably two times or more, more preferably five times or more, and further preferably ten times or more) a radius of curvature of each of the spoke reinforcing walls 13b2 located opposite sides of the connecting wall 18.

Figure 6:
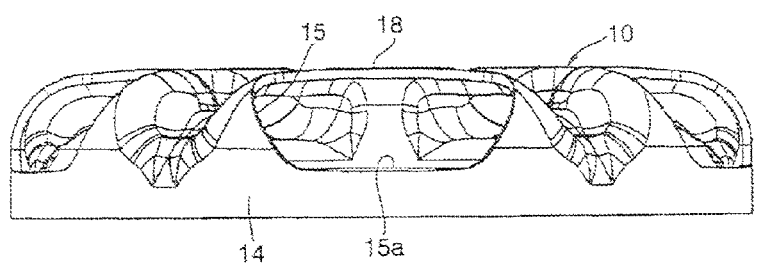
FIG. 6 is a side view of the vehicle wheel according to the embodiment shown in FIG. 1.

Further, as illustrated in FIG. 6, a portion of the connecting wall 18 most adjacent to the vent window 15 can have a flat configuration which is not convex and concave in the axial direction of the wheel.

A width of the connecting wall 18 in the wheel circumferential direction can be smaller than a largest interior width of the vent window 15 in the wheel circumferential direction. As illustrated in FIGS. 1 and 3, a radially inner end portion (an axially inner end portion) of the connecting wall 18 is connected to the inclined portion 17, and a radially outer end portion (an axially outer end portion) of the connecting wall 18 is connected to the vent window 15. The connecting wall 18 does not extend radially more inward than an outermost diameter of the hub coupling portion 12. A circumferential width of the portion of the connecting wall 18 where the connecting wall 18 is connected to the inclined portion 17 and a circumferential width of the portion of the connecting wall 18 where the connecting wall 18 is connected to the vent window 15 can be larger than a circumferential width of a radially intermediate portion (an axially intermediate portion) of the connecting wall 18.

Figure 7:
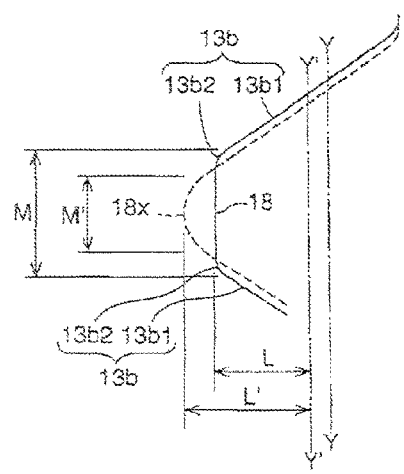
FIG. 7 is a cross section of the connecting wall of the vehicle wheel according to the embodiment shown in FIG. 1, shown in a full line, where a cross section of the rib of the conventional wheel disk is shown in a dotted line for comparison.

FIG. 7 illustrates the configuration of a crest wall portion 18x of a conventional rib (which has a configuration of an axially outwardly extending and radially inwardly extending convex arc having a single radius of curvature) by a dotted line and the configuration of the spoke side portion 13b and the connecting wall 18 of the wheel disk according to the present technology by a full line, so that the crest wall portion 18x and the connecting wall 18 can be compared with each other.

More particularly, the crest wall portion 18x of the rib of the conventional wheel disk having the convex arc with a single radius of curvature is replaced by the flat connecting wall of the wheel disk of the present technology which connects the pair of spoke reinforcing walls 13b2 of the pair of spoke side portions 13b located on opposite sides of the vent window 15 in the wheel circumferential direction and which has the configuration of a straight line, or an arc or ellipse having a radius of curvature larger than that of the spoke reinforcing wall 13b2.

By this structure, a distance L between the connecting wall 18 and a neutral axis Y-Y of bending deformation of the spoke portion 13 becomes smaller than a distance L' between the crest wall portion 18x and the neutral axis Y'-Y' of bending deformation of the conventional spoke portion. As a result, when a deformation of the same magnitude is generated, a stress caused in the connecting wall 18 can be smaller than a stress caused in the crest wall portion 18x of the rib of the conventional disk.

Further, since the circumferential width of the connecting wall 18 at the portion connecting to the inclined wall 17 is larger than the circumferential width of the radially intermediate portion of the connecting wall 18, a transmitted force to the inclined portion 17 can be dispersed so that a stress concentration is not liable to occur. As a result, a fatigue durability of the wheel disk 10 can be ensured.

Further, a width M of the connecting wall 18 in the circumferential direction of the wheel can be larger than a width M' of the crest wall portion 18x of the conventional rib. As a result, a cross-sectional area of the connecting wall 18 located far from the neutral axis when the spoke portion 13 is bending-deformed can be large, and a bending rigidity of the wheel disk 10 can be ensured.

Further, in the present technology, the conventional rib is not provided, where the conventional rib extends from the vent window surrounding curved portion located radially inside the vent window and curved axially inwardly to a portion located radially inside the ring region where the hub bolt holes are provided. As a result, a number and location of the spoke portions and a number and location of the hub coupling bolt holes are not restricted by the ribs as they are with the conventional wheel disk.

In a case where a number and location of the spoke portions 13 and a number and location of the hub coupling bolt holes 12a are allowed to be restricted by the connecting wall, the flat connecting wall 18 may extend radially more inwardly than the outer portion 12c of the hub coupling portion 12.

In a case where a protruding amount of the portion of the disk protruding outwardly from the spoke, bottom wall, 13a in the axial direction of the wheel is smaller than a protruding amount of the rib of the conventional wheel disk (which protrudes outwardly in the axial direction of the wheel and inwardly in the radial direction of the wheel at a portion located radially inside the vent window and has the crest wall having the configuration of a convex arc with a single curvature), a freedom for selecting an inset amount of the wheel 1 and a rim width of the wheel 1 can be increased.

In a case where a distance between the connecting wall 18 and a neutral axis of bending deformation of the spoke portion is smaller than a distance between the crest wall and a neutral axis in the rib of the conventional wheel disk, a stress caused in the connecting wall 18 can be small, which may ensure a durability or fatigue strength of the wheel disk 10.

In a case where the cross section of the flat connecting wall 18 taken along a plane perpendicular to the axial direction of the wheel has a configuration selected from a straight line or an arc or ellipse having a radius of curvature larger than the radius of curvature of the cross section of each of the spoke reinforcing walls 13b2 located on opposite sides of the connecting wall 18 taken along a plane perpendicular to the axial direction of the wheel, a cross-sectional area of a portion of the connecting wall 18 far from the neutral axis of bending deformation when the spoke portion 13 is deformed can be large. As a result, a bending rigidity of the wheel disk 10 may be ensured.

In a case where the durability and rigidity of the wheel disk 10 can be ensured even without a conventional wheel rib (which extends in a radial direction of the wheel from a first portion to a second portion, wherein the first portion is a vent window surrounding curved portion which is located radially inside the vent window and is curved axially inwardly, and the second portion is a portion located radially inside a ring region where hub bolt holes are provided), the conventional wheel rib can be removed so that a number and location of the spoke portions and the hub coupling bolt holes can be prevented from being affected by such a conventional wheel rib. Further, since the conventional wheel rib can be removed in such a case, hub nuts fastening work can be easier.

In a case where the maximum axial width H of the spoke side wall 13b1 of the spoke side portion 13b is within a range of two to twenty times the thickness of the spoke bottom wall 13a, a rigidity, a durability and a formability by stamping of the wheel disk 10 may be ensured.

In the case where the shift portion 14a is provided between the vent window 15 and the radially outer disk portion 14, a rigidity of the radially outer disk portion 14 can be high and further, assembly of the wheel disk 10 with the rim 20 can be easier.

What is claimed is:

1. A vehicle wheel disk comprising:
   a hub coupling portion;
   an inclined portion being substantially conical and rising from the hub coupling portion;
   a plurality of spoke portions each extending outwardly from the inclined portion in a radial direction of the wheel;
   a vent window located between adjacent spoke portions of the plurality of spoke portions; and
   a radially outer disk portion located at a radially outer end portion of the wheel and connecting radially outer end portions of the plurality of spoke portions in a circumferential direction of the wheel,
   wherein the inclined portion extends radially outwardly and axially outwardly from the radially outer portion of the hub coupling portion,
   wherein the spoke portion has a spoke bottom wall and a spoke side portion, the spoke bottom wall extending outwardly from the inclined portion in the radial direction of the wheel, the spoke side portion including a spoke side wall rising from the spoke bottom wall in an axial direction of the wheel and a spoke reinforcing wall connected from an axially end portion of the spoke side wall and curved from the axial direction of the wheel toward the circumferential direction of the wheel and extending in the circumferential direction of the wheel, and
   wherein a pair of spoke side portions located on opposite sides of the vent window in the circumferential direction of the wheel have radially inner end portions are both connected to a common connecting wall, the connecting wall being flat or substantially flat in the circumferential direction of the wheel, the connecting wall being connected to the inclined portion at a radially inner end of the connecting wall.

2. A vehicle wheel disk according to claim 1, wherein a circumferential width of the radially inner end of the connecting wall where the connecting wall is connected to the inclined wall is larger than a circumferential width of a radially intermediate portion of the connecting wall.

3. A vehicle wheel disk according to claim 1, wherein a maximum width of the spoke side wall of the spoke side portion in the axial direction of the wheel is within a range of two to twenty times a thickness of the spoke bottom wall.

4. A vehicle wheel disk according to claim 1, wherein a cross section of the connecting wall taken along a plane perpendicular to the axial direction of the wheel has a configuration selected from the group of configurations consisting of a straight line and an arc or ellipse, the arc or ellipse having a radius larger than a radius of a cross section of each of spoke reinforcing walls located on opposite sides of the connecting wall taken along a plane perpendicular to the axial direction of the wheel.

5. A vehicle wheel disk according to claim 4, wherein a circumferential width of the radially inner end of the connecting wall where the connecting wall is connected to the inclined wall is larger than a circumferential width of a radially intermediate portion of the connecting wall.

6. A vehicle wheel disk according to claim 4, wherein a maximum width of the spoke side wall of the spoke side portion in the axial direction of the wheel is within a range of two to twenty times a thickness of the spoke bottom wall.

7. A vehicle wheel disk according to claim 6, wherein a circumferential width of the radially inner end of the connecting wall where the connecting wall is connected to the inclined wall is larger than a circumferential width of a radially intermediate portion of the connecting wall.

* * * * *